United States Patent
Kaufmann et al.

(10) Patent No.: US 9,336,171 B2
(45) Date of Patent: May 10, 2016

(54) CONNECTION RATE MANAGEMENT IN WIDE PORTS

(71) Applicant: LSI Corporation, Milpitas, CA (US)

(72) Inventors: Reid A. Kaufmann, Andover, KS (US);
Jeffrey D. Weide, Augusta, KS (US);
Charles D. Henry, Wichita, KS (US);
Kalyn P. Kovac, Newton, KS (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 370 days.

(21) Appl. No.: 13/670,115

(22) Filed: Nov. 6, 2012

(65) Prior Publication Data

US 2014/0129723 A1 May 8, 2014

(51) Int. Cl.
| *G06F 13/14* | (2006.01) |
| *G06F 13/18* | (2006.01) |
| *G06F 3/06* | (2006.01) |
| *G06F 9/46* | (2006.01) |
| *G06F 13/38* | (2006.01) |

(52) U.S. Cl.
CPC .................................. *G06F 13/385* (2013.01)

(58) Field of Classification Search
CPC .......... G06F 15/16; G06F 13/385; G11C 8/00
USPC ......................................................... 709/227
See application file for complete search history.

(56) References Cited

U.S. PATENT DOCUMENTS

| 7,774,424 | B1 | 8/2010 | Bailey et al. |
| 8,095,722 | B1 | 1/2012 | Liao et al. |
| 8,880,812 | B1* | 11/2014 | Walch et al. .................. 711/149 |
| 2005/0108476 | A1* | 5/2005 | Tanaka ................... G06F 3/0613 711/114 |
| 2005/0138154 | A1* | 6/2005 | Seto .............................. 709/223 |
| 2005/0235072 | A1* | 10/2005 | Smith ...................... G06F 13/28 710/22 |
| 2007/0162592 | A1* | 7/2007 | Marks ................... G06F 3/0605 709/224 |
| 2007/0198761 | A1* | 8/2007 | Duerk ................ G06F 13/4291 710/307 |
| 2007/0220204 | A1* | 9/2007 | Nakajima ............. G06F 3/0607 711/114 |
| 2007/0294572 | A1* | 12/2007 | Kalwitz ............. G06F 11/0727 714/5.11 |
| 2008/0005314 | A1* | 1/2008 | Kaur .................... G06F 13/387 709/224 |
| 2008/0126623 | A1* | 5/2008 | Chang ................. G06F 13/4059 710/53 |
| 2008/0215926 | A1* | 9/2008 | Stenfort ............. G06F 13/4027 714/43 |
| 2009/0006697 | A1* | 1/2009 | Doherty et al. ............... 710/300 |
| 2009/0077276 | A1* | 3/2009 | Kato ...................... G06F 13/28 710/39 |
| 2009/0172206 | A1* | 7/2009 | Hall, IV ............. G06F 13/4081 710/10 |
| 2010/0088469 | A1* | 4/2010 | Motonaga et al. ............ 711/113 |
| 2011/0093625 | A1* | 4/2011 | Yoneda .......................... 710/19 |
| 2011/0106997 | A1* | 5/2011 | Romero et al. ............... 710/300 |
| 2011/0107002 | A1* | 5/2011 | Jones et al. ................... 710/312 |
| 2011/0113176 | A1* | 5/2011 | Johnson ............. G06F 11/2007 710/300 |
| 2011/0191644 | A1* | 8/2011 | Oldfield ................... H04B 1/38 714/704 |
| 2011/0320706 | A1* | 12/2011 | Nakajima ........... G06F 11/0793 711/114 |
| 2012/0023278 | A1* | 1/2012 | Jinno et al. ................... 710/300 |

(Continued)

*Primary Examiner* — Kevin Bates
*Assistant Examiner* — Mark A Scott

(57) ABSTRACT

A method for managing a request for an outbound connection is provided. The method includes the step of receiving the request for the outbound connection. The request includes a specified connection speed. The method also includes the step of comparing the request for the outbound connection to a plurality of outbound connection options. A further step of the method includes selecting an outbound connection from the plurality of outbound connection options. The selected outbound connection has a connection speed at least equal to the specified connection speed. The selected outbound connection also has the lowest connection speed of the outbound connection options having a connection speed at least equal to the specified connection speed.

20 Claims, 3 Drawing Sheets

(56) References Cited

U.S. PATENT DOCUMENTS

| | | | |
|---|---|---|---|
| 2012/0047325 A1* | 2/2012 | Sakuma et al. | 711/114 |
| 2012/0173840 A1* | 7/2012 | Patel | G06F 13/4022 711/202 |
| 2012/0233399 A1* | 9/2012 | Kurokawa | H04L 12/4625 711/114 |
| 2012/0246521 A1* | 9/2012 | Washiya et al. | 714/48 |
| 2013/0080829 A1* | 3/2013 | Colline | G06F 11/0727 714/6.22 |
| 2013/0246650 A1* | 9/2013 | Tsuboki | H04L 67/1097 709/236 |
| 2013/0268693 A1* | 10/2013 | Baker | G06F 3/061 710/5 |
| 2013/0343207 A1* | 12/2013 | Cook | H04L 43/0852 370/252 |
| 2013/0343380 A1* | 12/2013 | Canion | H04L 43/50 370/389 |
| 2014/0143464 A1* | 5/2014 | Natrajan | G06F 13/4027 710/117 |

* cited by examiner

CONNECTION RATE MANAGEMENT IN WIDE PORTS

BACKGROUND

Wide ports in Serial Attached Small Computer System Interface (SAS) systems may contain connections of different negotiated link rates. When arbitrating for an outbound connection from an initiator through a wide port having connections of different negotiated link rates, some of the intermediary connections may have lower negotiated link rates than the capabilities of the initiator and target device. Selecting a connection having a lower negotiated link rate than the required link rate can result in an open rejection due to an unsupported connection rate. In such cases, a retry may be required which slows down the connection process.

Therefore, there exists a need for improved methods and systems for managing the connection between devices through wide ports.

SUMMARY

The present disclosure is directed to a system for managing the connection between networked devices. The system includes an expander in communication with an initiator and a target. The initiator includes a plurality of initiators and the target includes a plurality of targets. The system also includes a wide port, which includes a plurality of outbound connections. Each outbound connection of the plurality of outbound connections has a particular connection speed. The outbound connections include different connection speeds and are not all identical. The system also includes an expander connection manager which is configured for selecting an outbound connection from the plurality of outbound connections in response to a request from the initiator. The request includes a specified connection speed, and the expander connection manager is configured to select an outbound connection having a connection speed at least equal to the specified connection speed. The selected outbound connection also has the lowest connection speed of the plurality of outbound connections which have a connection speed at least equal to the specified connection speed for the request. In this manner, the system manages the connection between the initiator and the target. This may improve efficiency by leaving outbound connections having greater connection speeds available for requests requiring the higher speed connections.

The present disclosure is also directed to a method for managing at least one request for an outbound connection. The method includes the step of receiving the request for the outbound connection. The request includes a specified connection speed. The method also includes the step of comparing the request for the outbound connection to a plurality of outbound connection options. A further step of the method includes selecting an outbound connection from the plurality of outbound connection options. The selected outbound connection has a connection speed at least equal to the specified connection speed. The selected outbound connection also has the lowest connection speed of the outbound connection options having a connection speed at least equal to the specified connection speed.

The present disclosure is also directed to a computer-readable device having computer-executable instructions for performing a method for managing at least one request for an outbound connection. The method includes the step of receiving the request for the outbound connection. The request includes a specified connection speed. The method also includes the step of comparing the request for the outbound connection to a plurality of outbound connection options. A further step of the method includes selecting an outbound connection from the plurality of outbound connection options. The selected outbound connection has a connection speed at least equal to the specified connection speed. The selected outbound connection also has the lowest connection speed of the outbound connection options having a connection speed at least equal to the specified connection speed.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
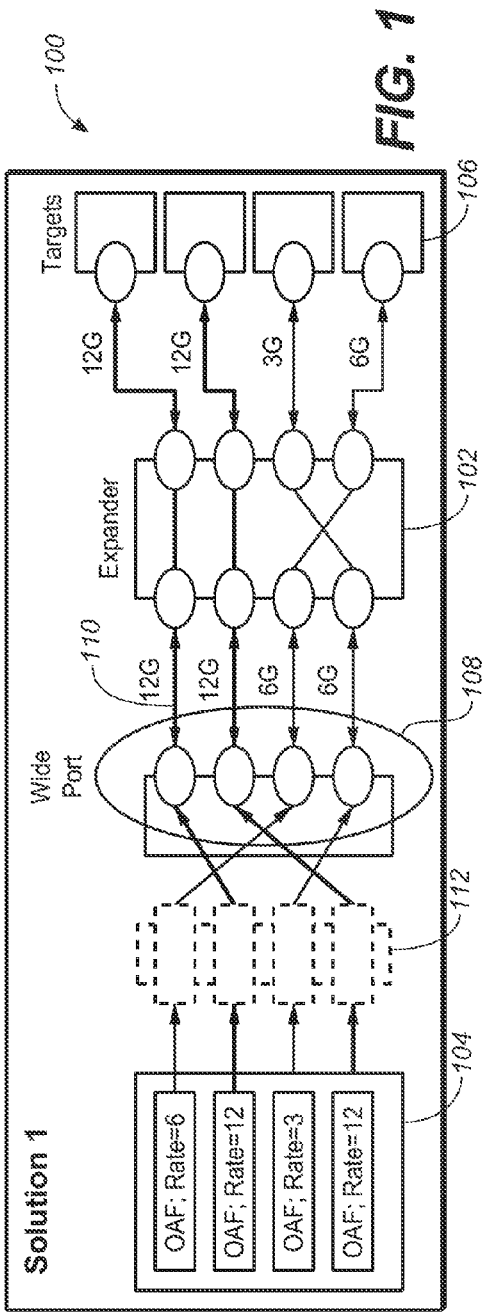
FIG. 1 shows a diagram of an embodiment of a system for managing a connection between networked devices.

Reference will now be made in detail to the subject matter disclosed, which is illustrated in the accompanying drawings. Referring generally to FIG. 1, a system 100 for managing the connection between networked devices is provided. In the embodiment shown in FIG. 1, the system 100 includes an expander 102 which is arranged between an initiator 104 and a target 106. The initiator 104 is configured for initiating a plurality of requests includes a plurality of initiators and the target 106 includes a plurality of targets. The system 100 also includes a wide port 108, which includes a plurality of outbound connections 110. Each outbound connection 110 of the plurality of outbound connections 110 has a connection speed. The connections 110 include several different connection speeds and are not all identical. The system 100 also includes an expander connection manager 112 which is configured for selecting an outbound connection 110 from the plurality of outbound connections 110 in response to a request from the initiator 104. The request includes a specified connection speed, and the expander connection manager 112 is configured to select an outbound connection having a connection speed at least equal to the specified connection speed. The selected outbound connection also has the lowest connection speed of the plurality of outbound connections which have a connection speed at least equal to the specified connection speed for the request. In this manner, the system 100 manages the connection between the initiator 104 and the target 106. This improves efficiency by leaving outbound connections having greater connection speeds available for requests requiring the higher speed connections.

The initiator 104 of the system 100 shown in FIG. 1 includes a device configured for initiating connection requests to connect to the target 106. In one embodiment, the initiator 104 includes a device configured for sending an Open Address Frame (OAF) request.

The target 106 of the system 100 shown in FIG. 1 includes a device configured for connecting to the initiator 104 through an intermediary device. In one embodiment, the intermediary device is an expander 102. The expander may include a Serial Attached SCSI (SAS) drive or a Serial ATA (SATA) drive in one embodiment. In another embodiment, the intermediary device includes a series of expanders.

The wide port 108 of the system 100 shown in FIG. 1 includes a plurality of connections 110 having at least two different connection rates. In one embodiment, the wide port 108 includes a plurality of phys having a variety of negotiated connection rates.

The expander 102 of the system 100 shown in FIG. 1 includes a device for providing access to the targets 106 in response to requests from the initiator 104. The expander 102 is arranged between the initiator 104 and the target 106 in one embodiment. The expander 102 is a Serial Attached SCSI (SAS) expander in one embodiment. In another embodiment, the expander 102 is a Serial ATA (SATA) drive.

The system 100 shown in FIG. 1 also includes an expander connection manager 112 which is configured for selecting an outbound connection 110 from the plurality of outbound connections 110 in response to the request from the initiator 104. The expander connection manager 112 is configured to select an outbound connection 110 having a connection speed at least equal to the connection speed specified for the request. The selected outbound connection will also have the lowest connection speed of the plurality of outbound connections 110 which have a connection speed at least equal to the specified connection speed for the request. In other words, the selected outbound connection will not have a connection speed that is greater than the connection speed of any other available connection having a connection speed at least equal to the specified connection speed. In this manner, the system 100 manages the connection between the initiator 104 and the target 106 by ensuring the request is serviced by an outbound connection 110 meeting the specified connection speed requirements, but having the lowest connection speed of all connections available to meet that requirement. This may have the benefit of improving efficiency by leaving outbound connections having faster connection speeds available for requests requiring the faster connections. An additional benefit may be a reduction in the number of rejected/unsupported connection requests due to a lack of a connection available to fulfill the specified connection speed for the request.

Figure 2:
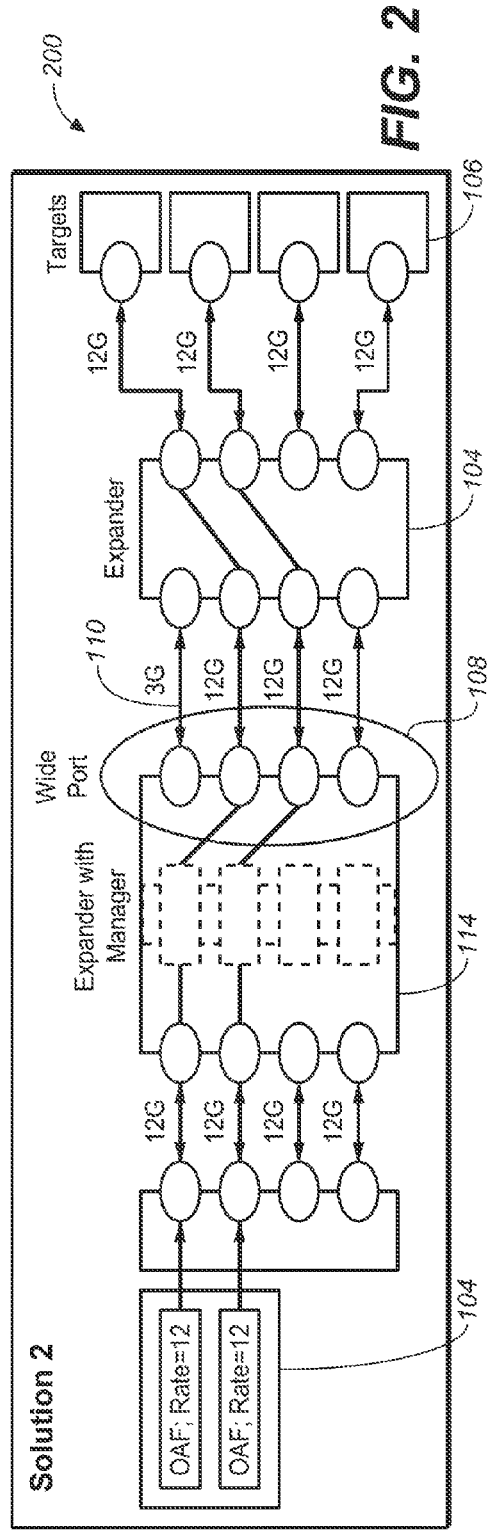
FIG. 2 shows a diagram of an alternative embodiment of a system for managing a connection between networked devices.

The expander connection manager 112, expander 102, and wide port 108 are separate elements in one embodiment as shown in FIG. 1. In another embodiment, the expander connection manager 112, the expander 102 and wide port 108 are combined, as shown in FIG. 2. In the embodiment shown in FIG. 2, the system 100 also includes an additional expander 114. It should be understood by those in the art that the invention is not limited to the embodiments disclosed. Alternative embodiments of the invention may include additional initiators, wide ports, and targets arranged in a cascaded manner.

In one embodiment, the expander connection manager 112 shown in FIGS. 1 and 2 is configured to select the outbound connection using a graduated round robin approach. The expander connection manager 112 is also configured to receive more than one request simultaneously from the initiator and select and outbound connection for multiple requests simultaneously.

In one embodiment, the expander connection manager 112 shown in FIGS. 1 and 2 is implemented on the initiator. In another embodiment, the expander connection manager 112 is implemented on the target. In yet another embodiment, the expander connection manager 112 is implemented on an expander.

Figure 3:
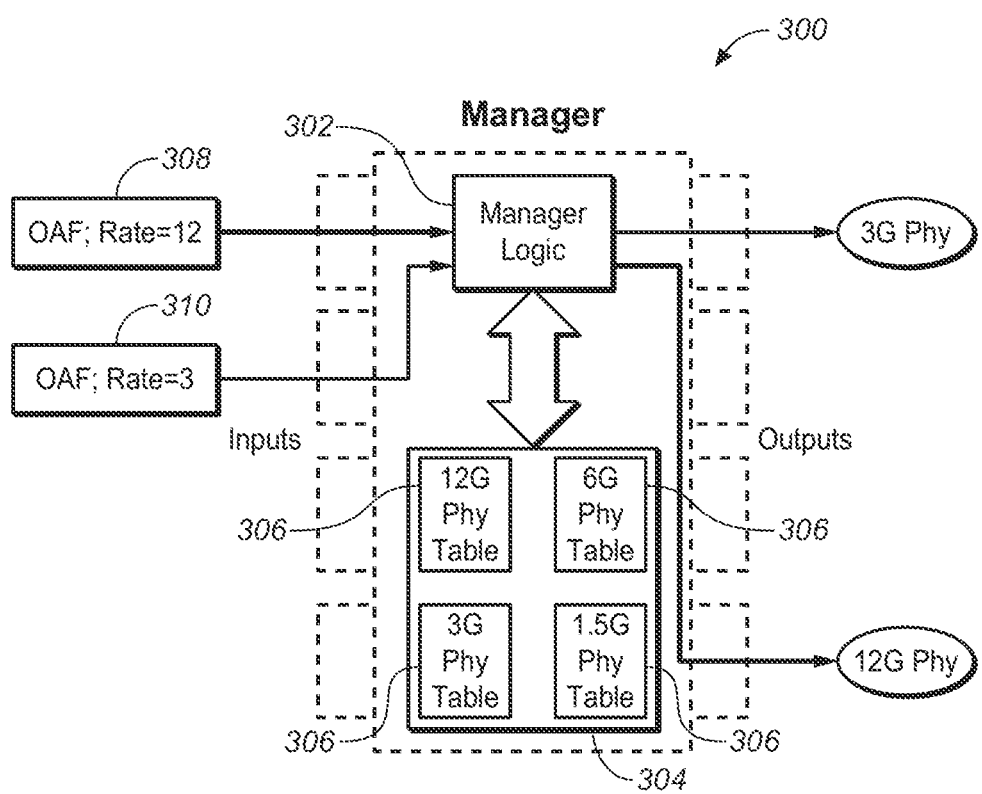
FIG. 3 shows a block diagram of an expander connection manager.

An embodiment of the expander connection manager 300 is shown in FIG. 3. The expander connection manager 300 includes expander connection manager logic 302. The expander connection manager 300 is configured to keep track of a list 304 of connections 306. In the embodiment shown in FIG. 3, each connection 306 has a different connection speed, ranging from 1.5 Gigabits per second up to 12 Gigabits per second. The expander connection manager 300 receives a first request 308 and a second request 310. Each request specifies a minimum connection rate. The expander connection manager 300 receives the requests and selects an appropriate connection 306 to service each request. The first request 308 has a minimum connection speed requirement of 12 Gigabits per second. The expander connection manager 300 compares the request 308 to the list 304 of connections 306 and the expander connection manager 300 selects the connection 306 having a connection speed of 12 Gigabits per second. The connection 306 is selected because this connection 306 is at least equal to the specified connection speed for the first request 308, but not exceeding the connection speed for any other available connection 306 that has a connection speed at least equal to the specified connection speed for the request 308.

The expander connection manager 300 shown in FIG. 3 also receives the second request 310. The second request 310 specifies a minimum connection speed of 3 Gigabits per second. The expander connection manager 300 compares the request 310 to the list 304 of connections 306 and the expander connection manager 300 selects the connection 306 having a connection speed of 3 Gigabits per second. The connection 306 having a connection speed of 3 Gigabits per second is selected because this connection 306 is at least equal to the specified connection speed (3 Gigabits per second) for the second request 310, but it does not exceed the connection speed for any other available connection 306 that has a connection speed at least equal to the specified connection speed for the request 310.

The connection speeds mentioned in this disclosure are intended to be merely exemplary and are not intended to limit the scope of the embodiments described herein. Specifically, the systems and methods of the present disclosure would be suitable for connection speeds exceeding those described in the examples, as well as lower connection speeds than those described.

In one embodiment, more than one connection request may be received and managed at the same time. In another embodiment, connection requests are handled one at a time in the order they are received.

Figure 4:
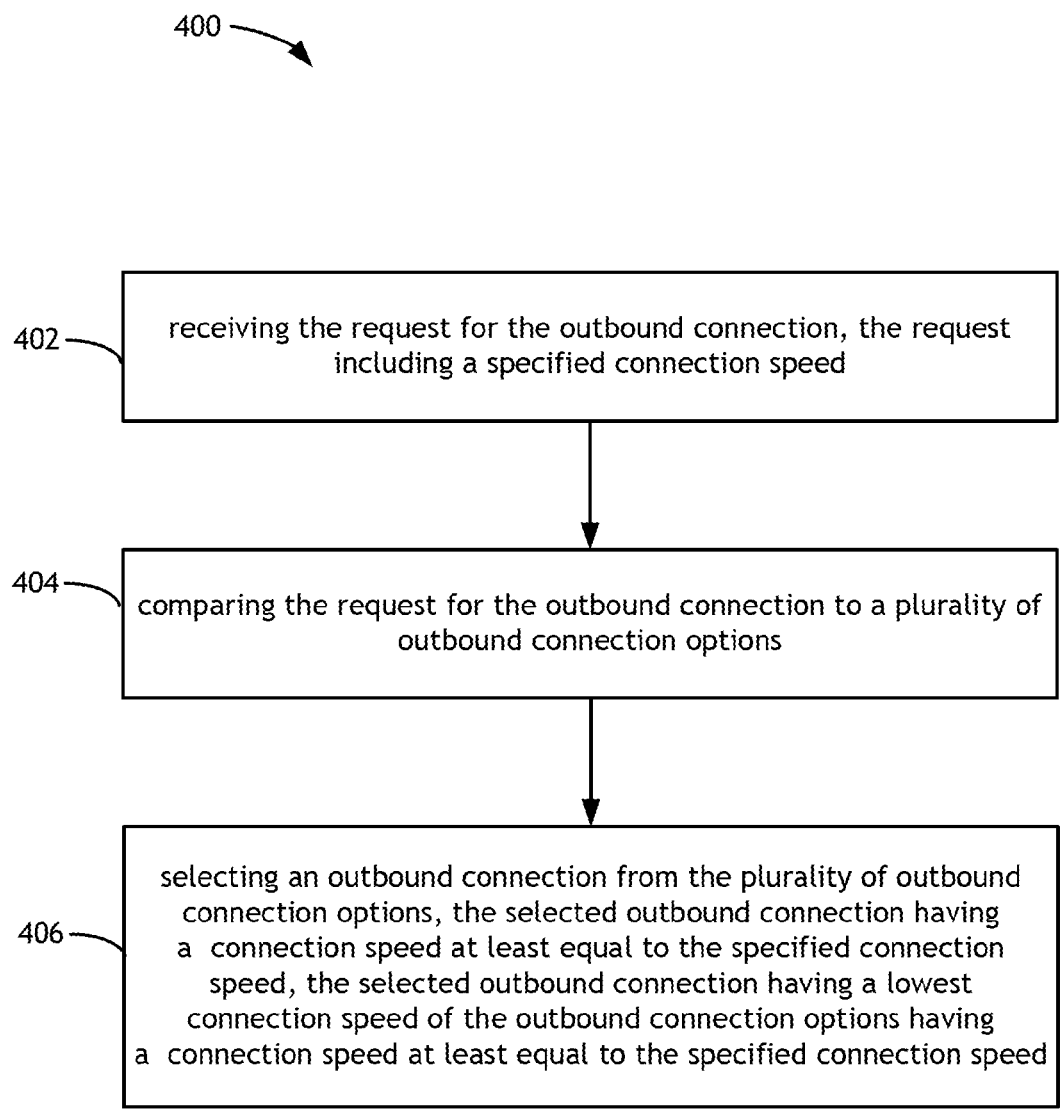
FIG. 4 shows a flow diagram of a method for managing at least one request for an outbound connection.

The present disclosure is also directed to the method 400 shown in FIG. 4. The method 400 is for managing at least one request for an outbound connection. The method 400 includes the step of receiving the request for the outbound connection 402. The request includes a specified connection speed. The method 400 also includes the step of comparing the request for the outbound connection to a plurality of outbound connection options 404. A further step of the method 400 includes selecting an outbound connection from the plurality of outbound connection options 406. The selected outbound connection has a connection speed at least equal to the specified connection speed. The selected outbound connection also has the lowest connection speed of the outbound connection options having a connection speed at least equal to the specified connection speed.

In one embodiment, the plurality of outbound connection options of the method 400 shown in FIG. 4 includes a plurality of outbound phys. The plurality of outbound phys are included in a wide port. In one embodiment, the request of the method 400 includes an Open Address Frame.

In one embodiment, the step of selecting an outbound connection from the plurality of outbound connection options 406 of the method 400 shown in FIG. 4 includes selecting an outbound connection using a graduated round robin approach.

In one embodiment, the method 400 is executed on a computer-readable device having computer-executable instructions. In one embodiment, the computer-readable device is part of an initiator. In another embodiment, the device is part of a target. In yet another embodiment, the device is incorporated as part of an expander. In another embodiment, the device is a software module executed by at least one processor.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art may include progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed is:

1. A method for managing a request for an outbound connection, the method comprising:

receiving the request for the outbound connection, the request including a specified Serial Attached SCSI (SAS) or Serial ATA (SATA) connection speed;

comparing the specified SAS or SATA connection speed of the request for the outbound connection to a plurality of connection speeds of a plurality of outbound connection options, each of the plurality of outbound connection options compared being available to fulfill the request when the comparison is made, wherein the comparison is made to improve connection availability of the plurality of outbound connection options;

selecting an outbound connection from the plurality of outbound connection options based on the plurality of outbound connection options compared, the selected outbound connection having a connection speed at least equal to the specified SAS or SATA connection speed, the selected outbound connection having a lowest connection speed of the outbound connection options having a connection speed at least equal to the specified SAS or SATA connection speed.

2. The method as claimed in claim 1, wherein the plurality of outbound connection options includes a plurality of outbound phys included in a wide port.

3. The method as claimed in claim 1, wherein the request includes an Open Address Frame.

4. The method as claimed in claim 1, wherein the selecting an outbound connection from the plurality of outbound connection options includes selecting an outbound connection using a graduated round robin approach.

5. The method as claimed in claim 1, wherein the method is implemented on an initiator.

6. The method as claimed in claim 1, wherein the method is implemented on a target.

7. The method as claimed in claim 1, wherein the method is implemented on an expander.

8. A system for managing a connection between networked devices, the system comprising:
   an expander, the expander arranged between an initiator and a target;
   a wide port, the wide port in communication with the expander, the wide port including a plurality of outbound connections, each outbound connection of the plurality of outbound connections including a connection speed;
   an expander connection manager, the expander connection manager in communication with the wide port, the expander connection manager configured for selecting a Serial Attached SCSI (SAS) or Serial ATA (SATA) outbound connection from a plurality of available outbound connections, the plurality of available outbound connections being selected from the plurality of outbound connections in response to a request from the initiator via the expander, wherein the selecting a SAS or SATA outbound connection from the plurality of available outbound connections in response to a request from the initiator via the expander includes selecting a SAS or SATA outbound connection to improve connection availability of the plurality of outbound connection options, the request including a specified connection speed, the selected SAS or SATA outbound connection having a connection speed at least equal to the specified connection speed, the selected SAS or SATA outbound connection having a lowest connection speed of the plurality of outbound connections and having a connection speed at least equal to the specified connection speed, and the plurality of available outbound connections being available to fulfill the request when the selection of the outbound connection is made.

9. The system as claimed in claim 8, wherein the expander connection manager is included with the expander.

10. The system as claimed in claim 8, wherein the expander connection manager is included with the target.

11. The system as claimed in claim 8, wherein the expander connection manager is included with the initiator.

12. The system as claimed in claim 8, wherein the plurality of connections includes a plurality of phys.

13. The system as claimed in claim 8, wherein the request includes an Open Address Frame.

14. The system as claimed in claim 8, wherein the expander connection manager is further configured to update the list of outbound connection options.

15. The system as claimed in claim 8, wherein the expander connection manager is further configured to select an outbound connection for a plurality of requests simultaneously.

16. The system as claimed in claim 8, wherein the expander connection manager selects an outbound connection using a graduated round robin approach.

17. A computer-readable device having computer-executable instructions for performing a method for managing at least one request for an outbound connection, the method comprising:
   receiving the request for the outbound connection, the request including a Serial Attached SCSI (SAS) or Serial ATA (SATA) specified connection speed;
   comparing the specified SAS or SATA connection speed of the request for the outbound connection to a plurality of connection speeds of a plurality of outbound connection options, each of the plurality of outbound connection options compared being available to fulfill the request when the comparison is made, the comparison being made to improve connection availability of the plurality of outbound connection options;
   selecting an outbound connection from the plurality of outbound connection options based on the plurality of outbound connection options compared, the selected outbound connection having a connection speed at least equal to the specified SAS or SATA connection speed, the selected outbound connection having a lowest connection speed of the outbound connection options having a connection speed at least equal to the specified SAS or SATA connection speed.

18. The device as claimed in claim 17, wherein the plurality of outbound connection options includes a plurality of outbound phys included in a wide port.

19. The device as claimed in claim 17, wherein the selecting an outbound connection from the plurality of outbound connection options may include selecting an outbound connection for a plurality of requests simultaneously.

20. The device as claimed in claim 17, wherein the selecting an outbound connection from the plurality of outbound connection options includes selecting an outbound connection using a graduated round robin approach.

* * * * *